S. R. HURLEY.
SOLDERED ROPE CHAIN.
APPLICATION FILED JULY 18, 1912.

1,055,751. Patented Mar. 11, 1913.

WITNESSES.
John H. Parker
R. Wallace.

INVENTOR:
Sarah R. Hurley
by Macleod, Calver, Copeland & Dike,
Attorneys.

UNITED STATES PATENT OFFICE.

SARAH R. HURLEY, OF NORTH ATTLEBORO, MASSACHUSETTS.

SOLDERED ROPE-CHAIN.

1,055,751.

Specification of Letters Patent.

Patented Mar. 11, 1913.

Application filed July 18, 1912. Serial No. 710,216.

*To all whom it may concern:*

Be it known that I, SARAH R. HURLEY, a citizen of the United States, residing at North Attleboro, county of Bristol, State of Massachusetts, have invented a certain new and useful Improvement in Soldered Rope-Chains, of which the following is a specification, reference being had therein to the accompanying drawings.

The invention relates to an improvement in that class of chains made of links of metal which are termed rope chains and has special reference to that class of such chains in which the links are formed in groups, the links of each group being soldered together and each group being loosely or flexibly connected with the adjacent group without any soldered connection between the groups. In the manufacture of such chains it is necessary to form each link with an open end or break between the ends of the link to enable them to be strung together, and I find that in order to obtain the necessary flexibility in the chain it is necessary to string the links together in such a manner that instead of pinching the open ends together to close the gap after the links are assembled the open space referred to between the ends of each link will be loosely engaged by the loop or closed end of one of the connecting links. I also find that if the chain is made in groups of three links some of the open ends are necessarily exposed and are liable to catch in the clothing or in the fingers in handling the chain instead of being properly covered up.

The object of my invention is to construct a chain of links in such manner that there will be flexible connection between the different groups of links and that there will be no exposed projecting ends of the links in each group.

The invention will be fully understood from the following description taken in connection with the accompanying drawings, and the novel features thereof will be pointed out and clearly defined in the claims at the close of this specification.

Figure 1:
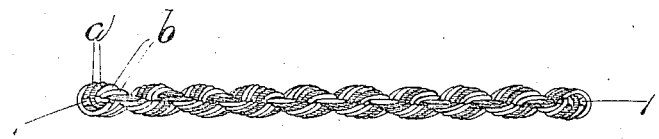
Figure 2:
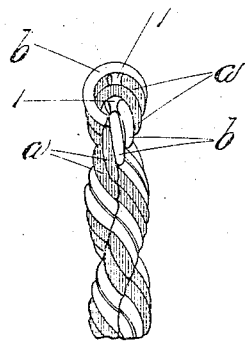
Figure 4:
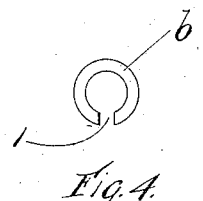
Figure 3:
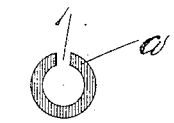
Figure 5:
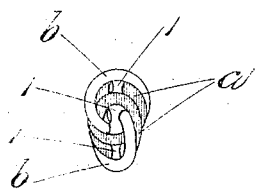

In the drawings,—Figure 1 is a plan of a link chain constructed in accordance with the invention. Fig. 2 is an enlarged view of a portion of the chain shown in Fig. 1. Fig. 3 is a view of one of the flushed or solder charged links. Fig. 4 is a detailed view of one of the uncharged links. Fig. 5 is a view of one of the groups of four links.

In carrying out the invention I form each group of links out of four single links and preferably form the two intermediate links *a* of what is termed charged or flushed wire, *i. e.*, wire having a coating of solder on the outside and form the two outer links *b* of uncharged or unflushed wire. Both kinds of links are formed with open ends making an opening *l* which enables the links to be assembled together. In assembling the links they are so arranged that the links which have the open end up alternate with the links which have the open end down and also so arranged that in each group the outermost links, *i. e.*, those at the ends of the group will have their open ends extending inwardly, that is, as viewed in Fig. 5 the uppermost link *b* has the open end down and the lowermost link *b* has the open end up so that there is no exposed open end. By assembling them in this way the closed or loop end of each link in a group lies loosely in the open space *l* between the ends of one of the links in another group. There is no possibility of the links becoming disengaged and there is no projection of the open ends to catch in the clothing or in the fingers. They are also so arranged that both of the end links *a* are of the uncharged wire and the intermediate links *b* are of the charged wire. After the links are assembled, then by applying heat the solder which is inherent in the charged links will be heated sufficiently so that each adjoining pair of charged links will adhere together and they will also cause to adhere to themselves the uncharged links on the outer sides of the charged links, but the two adjacent uncharged links of adjoining groups will have no adherence to each other but are flexibly connected.

What I claim is:

1. A soldered rope chain composed of metallic links in groups of four, each group consisting of two solder charged links and two uncharged links, the two charged links of each group being contiguous to each other and intermediate between the two uncharged links, each link, both charged and uncharged, being an open ring, the links being disposed with the open ends alternately headed in opposite directions, both end links of each group having the open end pointing inwardly, the four links of each group being all united together by the self contained solder of the charged links, each group of four as a whole having a flexible engagement with the adjacent group and being free from solder connection with the adjacent groups.

2. A soldered rope chain composed of metallic links in groups of four, each link being an open ring with a space between its ends, the two opposite end links being disposed with the open ends pointed inwardly toward each other, the two intermediate links having their open ends pointing outwardly in opposite directions from each other and toward the open end of the respective adjacent end link, the four links of each group being united together by solder, each group being free from solder connection with any other group and being flexibly connected with the adjacent groups at each end through the medium of the open ends of the links.

3. A soldered rope chain composed of metallic links in groups of four, each link being an open ring with a space between its ends, the links being disposed with the open ends alternately headed in opposite directions, both end links of each group having the open end pointed inwardly, the outer links of each group being composed of uncharged wire and the two intermediate links being of charged wire, the four links of each group being united together by the self contained solder of the charged links.

In testimony whereof I affix my signature, in presence of two witnesses.

SARAH R. HURLEY.

Witnesses:
WILLIAM A. COPELAND,
FRANCES GEHRUNG.